United States Patent
Kessler et al.

(10) Patent No.: US 9,797,436 B2
(45) Date of Patent: Oct. 24, 2017

(54) MINIMIZING OIL LEAKAGE FROM ROCKING JOURNAL BEARINGS OF TWO-STROKE CYCLE ENGINES

(71) Applicant: ACHATES POWER, INC., San Diego, CA (US)

(72) Inventors: John M. Kessler, Oceanside, CA (US); Clark A. Klyza, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 0 days.

(21) Appl. No.: 15/359,039

(22) Filed: Nov. 22, 2016

(65) Prior Publication Data
US 2017/0074315 A1     Mar. 16, 2017

Related U.S. Application Data

(63) Continuation of application No. 14/732,531, filed on Jun. 5, 2015, now Pat. No. 9,581,187.

(51) Int. Cl.
*F16C 9/04*     (2006.01)
*F02B 75/02*    (2006.01)
(Continued)

(52) U.S. Cl.
CPC ............... *F16C 9/04* (2013.01); *F01B 7/02* (2013.01); *F02B 75/02* (2013.01); *F02B 75/28* (2013.01);
(Continued)

(58) Field of Classification Search
CPC ........ F16C 9/04; F16C 7/023; F16C 2360/22; F16C 11/04; F16C 17/022; F16C 33/1065;
(Continued)

(56) References Cited

U.S. PATENT DOCUMENTS 2,407,429 A * 9/1946 Kuttner ............... F02F 3/003
                                                   123/41.37
2,625,448 A * 1/1953 Underwood .......... F16C 17/026
                                                    184/6.5
(Continued)

FOREIGN PATENT DOCUMENTS

GB          769352 A       3/1957

OTHER PUBLICATIONS

International Search Report and Written Opilon dated Aug. 17, 2016, for PCT/US2016/033814.
(Continued)

*Primary Examiner* — Long T Tran
(74) *Attorney, Agent, or Firm* — Terrance A. Meador

(57) ABSTRACT

A rocking journal bearing is provided in a piston coupling mechanism of a two-stroke cycle engine. The bearing includes a sleeve and a wristpin constructed with two sets of eccentrically-disposed bearing surfaces which alternate in accepting a compressive load during an operational cycle of the bearing. The sleeve includes a network of grooves to transport oil to the bearing surfaces. Lubricating oil flow through the bearing is minimized by limiting provision of pressurized oil from the wristpin to the network of grooves to portions of the cycle when one or the other of the sets of bearing surfaces receives the compressive load.

6 Claims, 9 Drawing Sheets

(51) Int. Cl.

| | | |
|---|---|---|
| *F02B 75/28* | (2006.01) | |
| *F16J 1/14* | (2006.01) | |
| *F16J 1/16* | (2006.01) | |
| *F16C 17/02* | (2006.01) | |
| *F16C 33/04* | (2006.01) | |
| *F01B 7/02* | (2006.01) | |
| *F16C 33/10* | (2006.01) | |
| *F01M 11/02* | (2006.01) | |

(52) U.S. Cl.
CPC .......... *F02B 75/282* (2013.01); *F16C 17/022* (2013.01); *F16C 33/04* (2013.01); *F16C 33/1065* (2013.01); *F16J 1/14* (2013.01); *F16J 1/16* (2013.01); *F01M 2011/025* (2013.01); *F01M 2011/026* (2013.01); *F02B 2075/025* (2013.01); *F16C 2360/22* (2013.01)

(58) Field of Classification Search
CPC .......... F16J 1/16; F16J 1/14; F16J 1/09; F16J 15/162; F01M 2011/027; F01M 2011/026; F01M 2001/086
See application file for complete search history.

(56) References Cited

U.S. PATENT DOCUMENTS

| | | | | |
|---|---|---|---|---|
| 2,757,990 A | * | 8/1956 | Barlow | F16J 1/14 384/155 |
| 3,056,638 A | * | 10/1962 | Hovde | F16J 1/14 123/193.6 |
| 3,120,184 A | | 2/1964 | Ellern | 102/336 |
| 3,495,685 A | * | 2/1970 | Van Rinsum | F01M 1/06 384/288 |
| 4,013,057 A | * | 3/1977 | Guenther | F02B 23/0696 123/193.6 |
| 4,398,507 A | * | 8/1983 | Belsanti | F01M 1/06 123/41.38 |
| 4,576,126 A | * | 3/1986 | Ancheta | F01M 1/02 123/193.6 |
| 4,969,430 A | | 11/1990 | Masuda | 123/196 |
| 6,120,189 A | * | 9/2000 | Beagle | F16C 11/02 384/255 |
| 7,954,600 B2 | | 6/2011 | Ohta | 184/6.5 |
| 8,376,620 B2 | | 2/2013 | Yamazaki et al. | 384/288 |
| 9,175,725 B2 | | 11/2015 | Dion et al. | 384/129 |
| 2012/0073526 A1 | * | 3/2012 | Dion | F01B 7/08 123/41.44 |
| 2014/0238360 A1 | * | 8/2014 | Dion | F16J 1/09 123/51 B |
| 2017/0167531 A1 | | 6/2017 | Kessler et al. | F16C 9/04 |

OTHER PUBLICATIONS

Notice of Allowance dated Jan. 4, 2017, for U.S. Appl. No. 14/732,531.

* cited by examiner

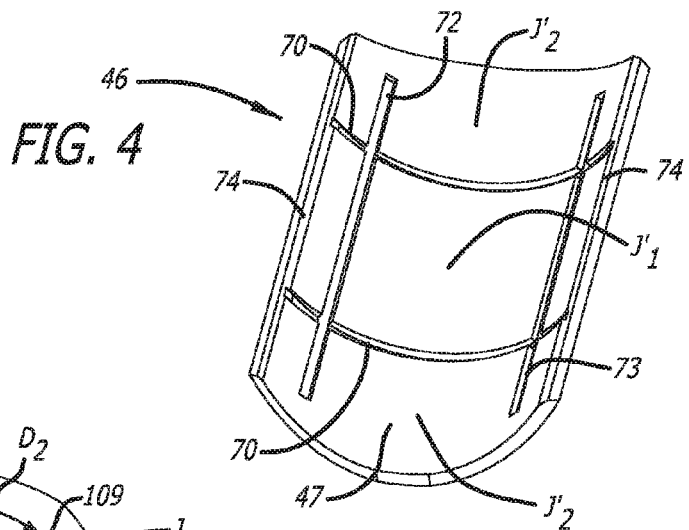
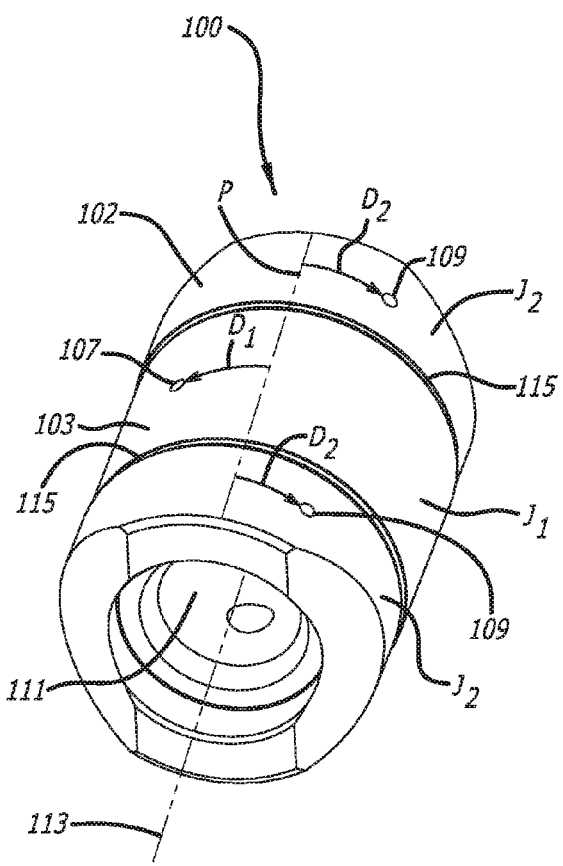
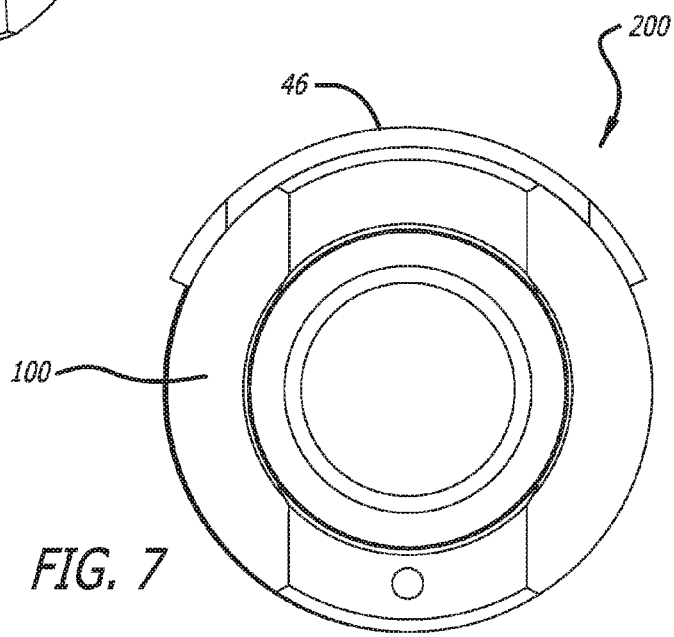

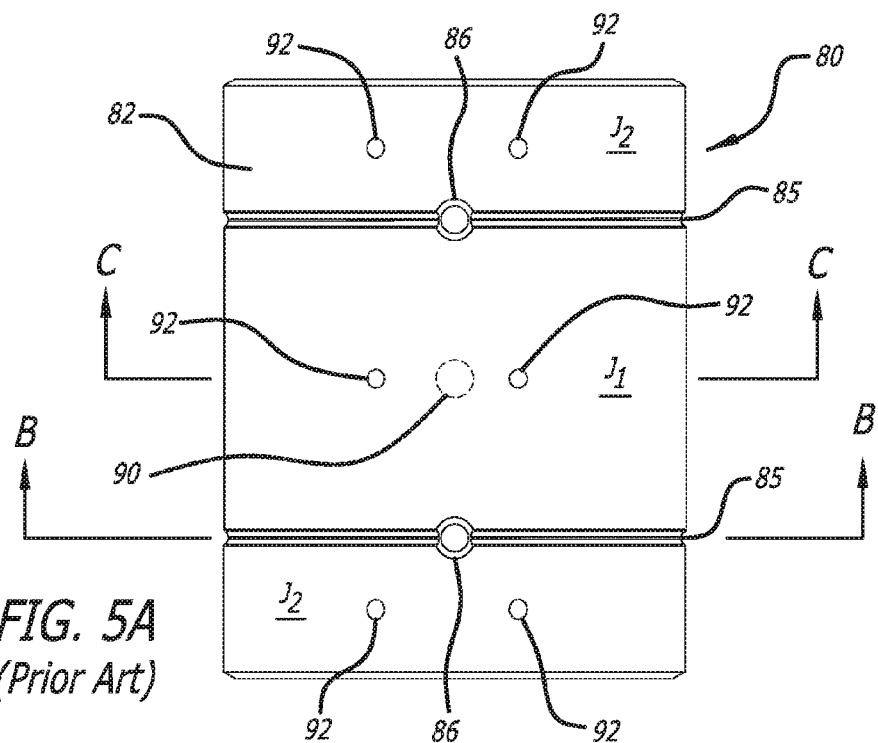
FIG. 5A
(Prior Art)
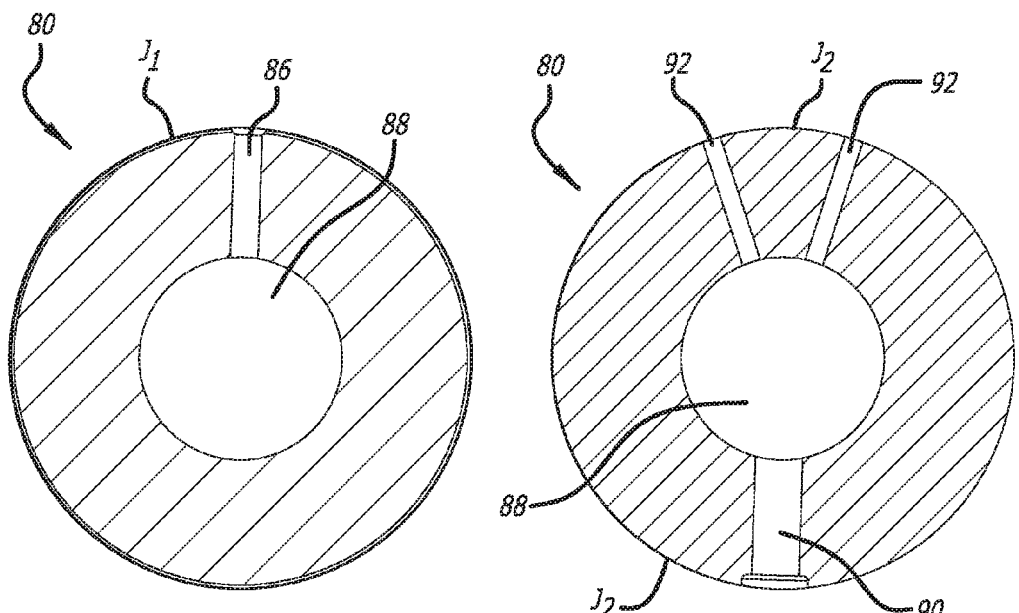
FIG. 5B
(Prior Art)
FIG. 5C
(Prior Art)

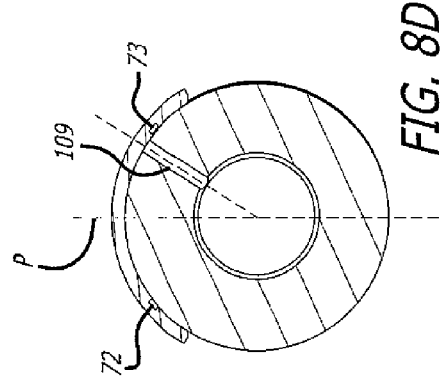
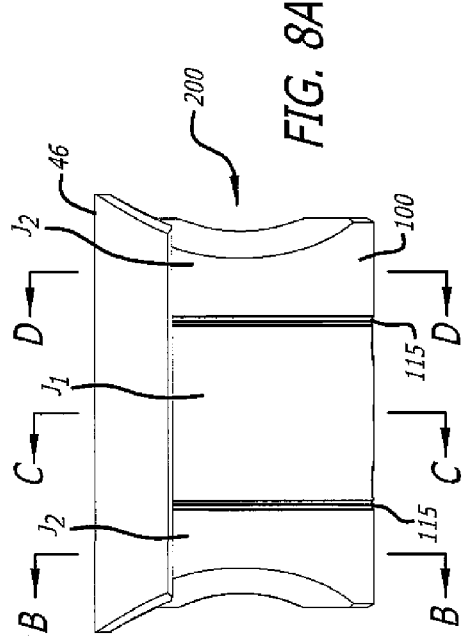
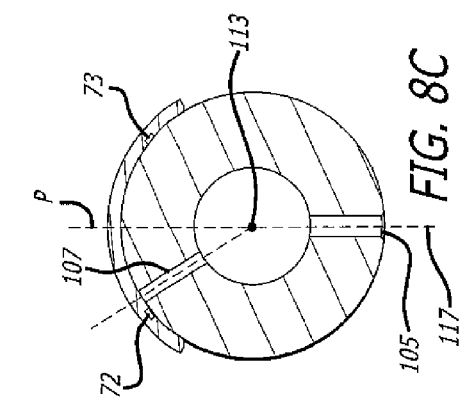
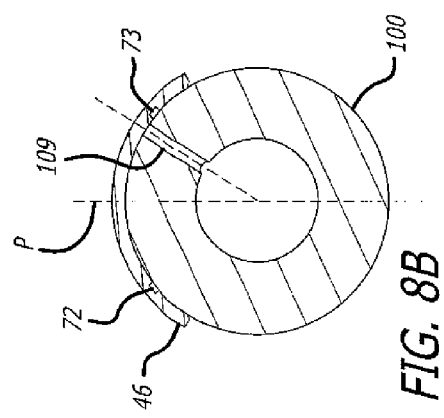

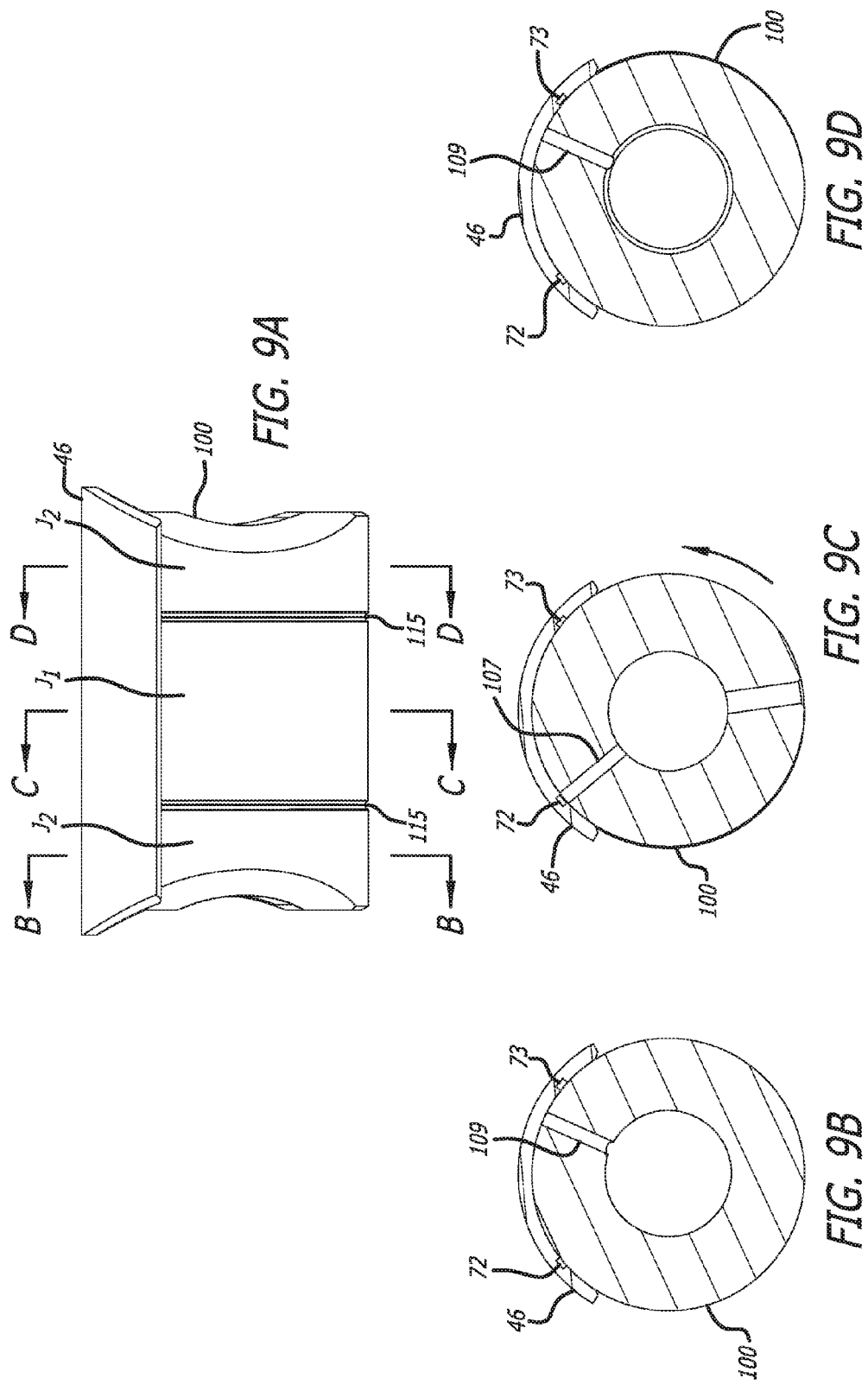

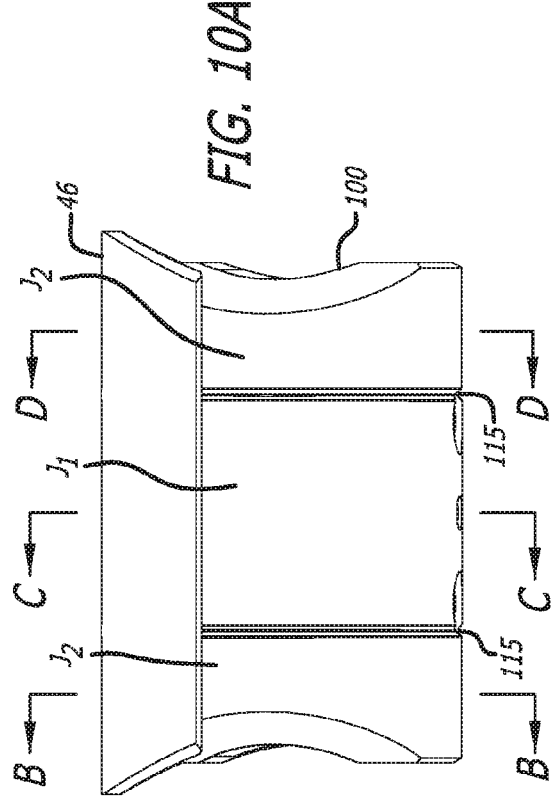
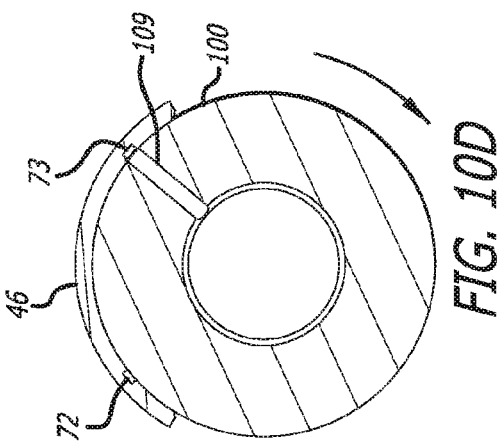
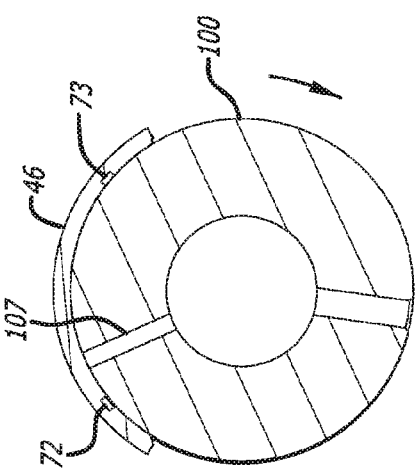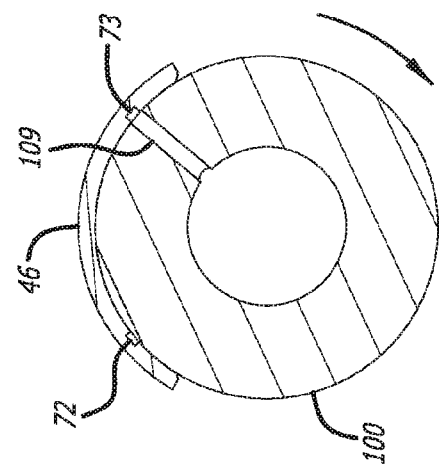

$J_1$' Lifted
$J_2$'s Loaded $J_1$' Loaded
$J_2$'s Lifted $J_1$' Loaded
$J_2$'s Loaded

MINIMIZING OIL LEAKAGE FROM ROCKING JOURNAL BEARINGS OF TWO-STROKE CYCLE ENGINES

PRIORITY

This application is a continuation of U.S. patent application Ser. No. 14/732,531, filed Jun. 5, 2015, for "Minimizing Oil Leakage From Rocking Journal Bearings Of Two-Stroke Cycle Engines".

RELATED APPLICATIONS

This application contains subject matter related to the subject matter of commonly-owned U.S. patent application Ser. No. 13/776,656, filed Feb. 25, 2013, titled "Rocking Journal Bearings for Two-Stroke Cycle Engines". published as US 2014/0238360 A1 on Aug. 28, 2014.

FIELD OF THE DISCLOSURE

The field is rocking journal bearings. More specifically, the field concerns rocking journal bearings that are incorporated into the piston coupling mechanisms of two-stroke cycle engines, for example, opposed-piston engines.

BACKGROUND OF THE DISCLOSURE

Due to the nature of the two-stroke cycle, a load reversal on a journal bearing of a two-stroke engine such as a wristpin may never occur during the normal speed and load range operation of the engine, or the duration of a load reversal might be relatively short. In these circumstances, it is difficult to replenish the bearings with lubricating oil ("oil"). Furthermore, given limited angular oscillation of the bearing, oil introduced between the bearing surfaces does not completely fill the bearing. Eventually the bearing begins to operate in a boundary layer lubrication mode (also called "boundary lubrication mode"), which leads to excess friction, wear, and then bearing failure.

A representative two-stroke cycle engine is embodied in the opposed-piston engine 8 of FIG. 1. The engine 8 includes one or more cylinders such as the cylinder 10. The cylinder 10 is constituted of a liner (sometimes called a "sleeve") retained in a cylinder tunnel formed in a cylinder block. The liner includes a bore 12 and longitudinally displaced intake and exhaust ports 14 and 16, machined or formed in the liner near respective ends thereof. Each of the intake and exhaust ports includes one or more circumferential arrays of openings in which adjacent openings are separated by a solid portion of the cylinder wall (also called a "bridge").

One or more injection nozzles 17 are secured in threaded holes that open through the sidewall of the liner, between the intake and exhaust ports. Two pistons 20, 22 are disposed in the bore 12 of the cylinder liner with their end surfaces 20e, 22e in opposition to each other. For convenience, the piston 20 is referred to as the "intake" piston because of its proximity to, and control of, the intake port 14. Similarly, the piston 22 is referred to as the "exhaust" piston because of its proximity to, and control of, the exhaust port 16. The engine includes two rotatable crankshafts 30 and 32 that are disposed in a generally parallel relationship and positioned outside of respective intake and exhaust ends of the cylinder. The intake piston 20 is coupled to the crankshaft 30 (referred to as the "intake crankshaft"), which is disposed along an intake end of the engine 8 where cylinder intake ports are positioned; and, the exhaust piston 22 is coupled to the crankshaft 32 (referred to as the "exhaust crankshaft"), which is disposed along an exhaust end of the engine 8 where cylinder exhaust ports are positioned.

Operation of a two-stroke cycle, opposed-piston engine with one or more cylinders is well understood. Using the engine 8 as an example, each of the pistons 20, 22 reciprocates in the bore 12 between a bottom center (BC) position near a respective end of the liner 10 where the piston is at its outermost position with respect to the cylinder, and a top center (TC) position where the piston is at its innermost position with respect to the cylinder. At BC, the piston's end surface 20e, 22e is positioned between a respective end of the cylinder, and its associated port, which opens the port for the passage of gas. As the piston moves away from BC, toward TC, the port is closed. During a compression stroke each piston moves into the bore 12, away from BC, toward its TC position. As the pistons approach their TC positions, air is compressed between their end surfaces. Fuel is injected into the compressed air. In response to the pressure and temperature of the compressed air, the fuel ignites and combustion follows, driving the pistons apart in a power stroke. During a power stroke, the opposed pistons move away from their respective TC positions. While moving from TC, the pistons keep their associated ports closed until they approach their respective BC positions. In some instances, the pistons may move in phase so that the intake and exhaust ports 14, 16 open and close in unison. Alternatively, one piston may lead the other in phase, in which case the intake and exhaust ports have different opening and closing times.

In FIG. 1, the pistons 20 and 22 are connected to the crankshafts 30 and 32 by respective coupling mechanisms 40 including journal bearings 42. The journal bearings 42 are continuously subjected to non-reversing, compressive loads during operation of the engine 8. Related U.S. patent application Ser. No. 13/776,656 describes and illustrates a solution to the problem of non-reversing compressive loads for two-stroke cycle, opposed-piston engines. The solution includes a rocking journal bearing (also called a "rocking bearing" or a "biaxial bearing"), which is incorporated into the engine 8 of FIG. 1. Each journal bearing 42 of each coupling mechanism 40 of the engine 8 is constructed as a rocking journal bearing. Referring to FIGS. 1 and 2, a coupling mechanism 40 supports a piston 20 or 22 by means of a rocking journal bearing 42 including a bearing sleeve 46 having a bearing surface 47, and a wristpin 48. The wristpin 48 is retained on the small end 49 of a connecting rod 50 for rocking oscillation on the bearing surface of the sleeve by threaded fasteners 51 received in threaded holes 52. The large end 53 of the connecting rod 50 is secured to an associated crankpin 54 of a respective one of the crankshafts 30, 32 by conventional fasteners (not shown).

As seen in FIG. 3, the wristpin 48 is a cylindrical piece that comprises a plurality of axially-spaced, eccentrically-disposed journal segments. A first journal segment $J_1$ comprises an annular bearing journal surface formed in an intermediate portion of the wristpin, between two journal segments $J_2$. The two journal segments $J_2$ comprise respective annular bearing journal surfaces formed on opposite ends of the wristpin, on respective sides of the journal segment $J_1$. The journal segment $J_1$ has a centerline A. The journal segments $J_2$ share a centerline B that is offset from the centerline A of journal segment $J_1$. As seen in FIG. 3, the sleeve 46 is a semi-cylindrically shaped piece with a bearing surface that includes a plurality of axially-spaced, eccentrically-disposed surface segments. A first surface segment $J_1'$ comprises an arcuately-shaped bearing surface formed in an intermediate portion of the sleeve, between two surface segments $J_2'$. The two surface segments $J_2'$ comprise arcuately-shaped bearing surfaces formed at opposite ends of the sleeve, on respective sides of the surface segment $J_1'$. The surface segment $J_1'$ has a centerline A'. The wristpin 48 is mounted to the small end 49 of the connecting rod 50 and the sleeve is mounted to an internal structure of the piston (not shown), such that corresponding bearing segment sets $J_1$-$J_1'$ and $J_2$-$J_2'$ are in opposing contact. Thus disposed, the opposing corresponding segment sets $J_1$-$J_1'$ and $J_2$-$J_2'$ may also be called "bearing interfaces".

In operation, as the piston to which they are mounted reciprocates between TC and BC positions, oscillatory rocking motion between the wristpin 48 and the sleeve 46 causes the bearing interfaces J1-J1' and J2-J2' to alternately receive the compressive load. The bearing surface segments receiving the load come together and the bearing surface segments being unloaded separate. Separation enables a film of oil to enter space between the separating bearing surfaces. The point at which the compressive load is shifted from one to the other set of bearing segments is referred to as a "load transfer point." During one full cycle of the two-stroke cycle engine, this point is traversed twice by each piston, once when the piston moves from TC to BC (that is to say, during the power stroke), and again when the piston moves from BC to TC (during the compression stroke). For illustration and as an aid in visualization, but without limiting the following disclosure, the load transfer points of the pistons may occur at or near crankshaft positions of 0° (when the pistons pass through their respective TC locations) and 180° (when the pistons pass through their respective BC locations).

With reference to FIGS. 1 and 2, the rocking journal bearings are constructed to enable provisioning and distribution of oil at pressures adequate to lubricate the rocking bearing interfaces with a continuous oil film thick and widespread enough to support heavy loading, thereby enhancing the durability of the bearing. The construction of the wristpin 48 includes a gallery 60 which receives and distributes oil for lubricating the bearing interfaces (J1-J1' and J2-J2'). The gallery 60 is fed pressurized oil from a pumped oil source. The wristpin 48 includes an oil inlet into, and multiple oil outlets from, the gallery 60. The gallery 60 receives the pressurized oil through an inlet opening 62 that opens through a portion of the wristpin surface that is out of contact with the sleeve surface segments. The pressurized oil is delivered via a high-pressure oil passage 64 in the connecting rod. Pressurized oil is provided to the bearing interfaces (J1-J1' and J2-J2') from the gallery 60 through outlets that act through a portion of the wristpin surface in contact with the sleeve's bearing surface during oscillation of the bearing. An influx of pressurized oil into the gallery 60 provides a continuous supply of pressurized oil to the bearing during operation of the engine.

As seen in FIG. 4, oil is circulated to the bearing interfaces via a network of oil grooves formed in the bearing surface 47 of the sleeve 46 for transporting oil to the bearing surface. The network includes circumferential oil grooves 70 for transporting oil in a circumferential direction of the bearing surface. The circumferential oil grooves 70 are formed in the bearing surface at the borders between the central surface segment J1' and the lateral surface segments J2'. The network further includes circumferentially-spaced, axial oil grooves 72 and 73, each for transporting oil in an axial direction of the bearing surface. The axial oil grooves are formed in the bearing surface transversely to and intersecting with the circumferential oil grooves 70. Each of the axial oil grooves 72 and 73 runs across the central surface segment J1' and extends at least partially into each of the lateral surface segments J2'. Chamfers 74 may be formed along opposing lateral peripheries of the bearing surface 47.

FIGS. 5A-5C show a prior art rocking journal wristpin constructed to deliver oil to the sleeve's bearing surface 47.

FIGS. 5A-5C show a rocking journal wristpin 80 with an outer surface 82 having journal segments J1 and J2 that contact surface segments J1' and J2' of the sleeve bearing surface 47 during oscillation of the bearing. The journal segments J1 and J2 are separated by circumferential grooves 85 in the wristpin outer surface 82. Outlet passages formed in the wristpin provide pressurized oil to the sets of surface segments during relative oscillatory motion between the sleeve and wristpin. First oil outlet passages 86 for delivering pressurized oil are formed in the contacting portion of the outer surface 82 and extend through the sidewall of the wristpin in the circumferential grooves 85 in a radial direction of the journal segment J1 and open into an oil gallery 88. An oil inlet 90 to the oil gallery 88 and the first oil outlet passages 86 are axially spaced, in diametrical opposition. Second oil outlet passages 92 are formed through the sidewall of the wristpin, outside of the circumferential grooves 85, and open into the oil gallery 88. The second oil outlet passages 92 are arranged in an axial array such that there is at least one second oil outlet passage located in each journal segment J1 and J2. The wristpin 80 is assembled to the sleeve 46 of FIG. 4 with the journal segments J1-J2 in opposition to the surface segments J1'-J2' and the circumferential grooves 85 of the wristpin aligned with the circumferential grooves 70 of the sleeve. As per FIGS. 4 and 5A, during operation of the engine, the first oil outlet passages 86 continuously supply pressurized oil to the network comprising circumferential oil grooves 70, which flows to the axial oil grooves 72 and 73. As relative oscillation occurs between the wristpin 80 and the sleeve 46, pressurized oil flows to the space between the separated segments continuously from the oil grooves 70, 72, and 73 and intermittently from the second oil outlet passages 92 as the journal segments in which they are located separate from their opposing surface segments of the sleeve.

Thus, the prior art wristpin oil delivery construction provides a constant supply of pressurized oil to the oil grooves 70, 72 and 73 in the sleeve surface; and, the oil grooves continuously transport oil to the journal segments. However, a continuous supply of pressurized oil results in a high level of oil flow from the ends of the circumferential grooves 70. This excess oil is detrimental to the performance of the engine for at least two reasons. First, the continuous provision of pressurized oil requires pumping work to supply the oil to the grooves, which reduces the engine's efficiency. Second, the oil comes in contact with the rotating and reciprocating machinery while returning to an engine oil sump. Extra parasitic drag caused by oil returning to the sump and interacting with a swirling cloud of air in the crankcase of the engine created by the high-speed rotation of the crankshafts, ("windage"), results in frictional losses. At 3,000 RPM, for example, each crankshaft must rotate 50 times per second. As the crankpins and counterweights rotate at such high speeds, they create a swirling cloud of air around them. As a result windage friction losses occur when excess oil is caught up in this turbulent air, drawing energy from the engine to spin the oil mist. Windage may also inhibit the migration of oil into the sump and back to the oil pump, creating lubrication problems. It is therefore desirable to minimize the amount of excess pressurized oil that flows through the rocking bearing journals of an engine.

SUMMARY OF THE DISCLOSURE

Lubricating oil flow through the rocking journal bearing is minimized by limiting provision of pressurized oil from the wristpin to the network of oil grooves in the sleeve to portions of a bearing operating cycle when one or the other of the sets of bearing surfaces receives the compressive load. Excess flow of oil through the rocking journal bearing is minimized by providing pressurized oil to the network intermittently during relative movement between the sleeve and the wristpin.

BRIEF DESCRIPTION OF THE DRAWINGS

FIG. 4 is a perspective view showing a bearing surface of a rocking journal sleeve.

FIGS. 5A-5C show a rocking journal wristpin constructed to provide oil for lubricating a rocking journal bearing comprising the sleeve of FIG. 4, and are properly labeled "Prior Art".

FIG. 6 is a perspective view of a rocking journal wristpin according to this disclosure.

FIG. 7 is an end elevation view of a rocking journal bearing according to this disclosure comprising the sleeve of FIG. 4 and the wristpin of FIG. 6.

FIG. 8A is a side elevation view and FIGS. 8B-8D are cross-sectional views of the rocking journal bearing of FIG. 7 showing details of bearing lubrication at a load transfer point of the bearing.

FIG. 9A is a side elevation view and FIGS. 9B-9D are cross-sectional views of the rocking journal bearing of FIG. 7 showing details of bearing lubrication at a first loading point of the bearing.

FIG. 10A is a side elevation view and FIGS. 10B-10D are cross-sectional views of the rocking journal bearing of FIG. 7 showing details of bearing lubrication at a second loading point of the bearing.

DETAILED DESCRIPTION

Figures 2, 3:
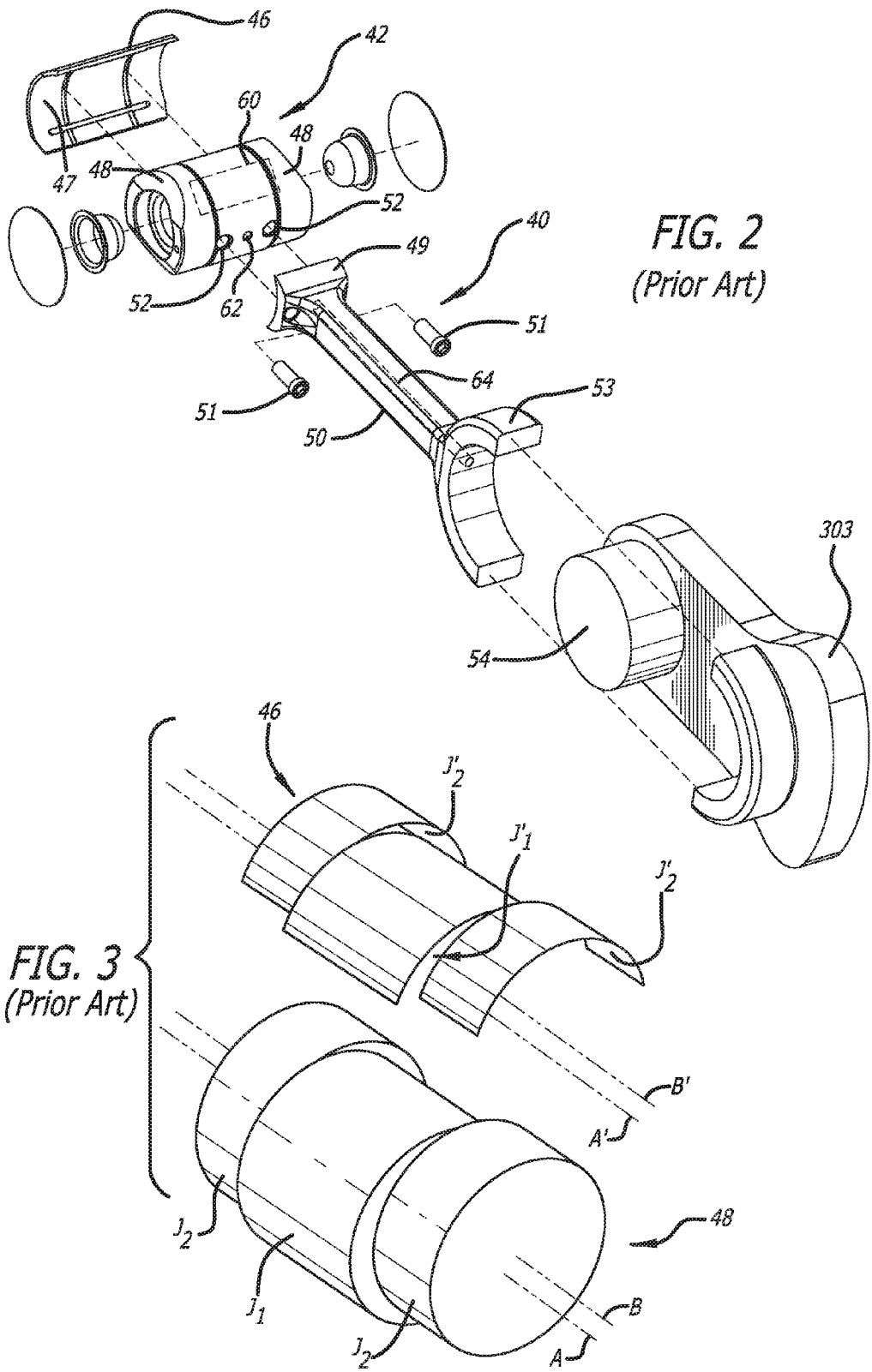
FIG. 2 is an exploded perspective view of a piston coupling mechanism including a rocking journal bearing, and is properly labeled "Prior Art".
FIG. 3 is a schematic diagram illustrating the bearing surfaces of the rocking journal of FIG. 2, and is properly labeled "Prior Art".

FIG. 6 shows a wristpin 100 according to this disclosure that is combined with the sleeve 46 of FIG. 4 to form a rocking journal bearing 200 as shown in FIG. 7 in which the flow of excess pressurized oil from the bearing 200 is reduced throughout its operational cycle. In this regard, pressurized oil is provided intermittently instead of continuously to the network of oil grooves in the bearing surface of the sleeve. The view in FIG. 6 is toward a contacting portion 102 of the wristpin outer surface 103 that is in contact with the sleeve bearing surface 47 during oscillation of the bearing. The wristpin is constructed with axially-offset surface segments J1 and J2 as per FIG. 3. As best seen in FIG. 8C, an oil inlet passage 105 is formed in the non-contacting portion of the J1 segment of the wristpin. As per FIG. 6, at least one oil outlet passage 107 is formed in the contacting portion of the J1 journal segment. At least one oil outlet passage 109 is formed in the contacting portions of each of the J2 journal segments. The oil outlet passages 107 and 109 open through the wristpin sidewall to oil gallery space 111 within the wristpin, and are offset along the wristpin's longitudinal axis 113 relative to the circumferential grooves 115 that separate the segments J1 and J2. There are no oil outlet passages along either of the circumferential grooves 115. The wristpin 100 is assembled to the sleeve 46 with the journal segments J1-J2 in engagement with the surface segments J1'-J2' and the circumferential grooves 115 of the wristpin 100 aligned with the circumferential grooves 70 of the bearing surface 47. As relative oscillation occurs between the wristpin 100 and the sleeve 46, pressurized oil flows to the space between the separated segments from the oil grooves 70, 72, and 115 and from the outlet passages 107 and 109 located in the separated journal segments of the wristpin.

With reference to FIGS. 6 and 8C, to carry out the purposes of a rocking journal bearing construction according to this disclosure, the positioning of the oil outlet passage 107 locates the oil outlet passage in the J1 journal segment at a first arcuate distance D1 from one side of a cut plane P containing the longitudinal axis 113 of the wristpin and a radius 117 forming the axis of the oil inlet passage 105. The positioning of the oil outlet passages 109 locates these oil outlet passages in respective J2 journal segments at a second arcuate distance D2 from the opposite side of the cut plane P. Thus, as the rocking journal 200 is viewed as per FIGS. 8A-8D, in which the rotational position of the wristpin 100 relative to the sleeve 46 is 0°, as would occur when the load transfer point of the bearing 200 is traversed, the oil outlet passages 107 and 109 are positioned between the axial oil grooves 72 and 73 of the sleeve 46, with the oil outlet passage 107 relatively nearer (for example, adjacent) to the axial oil groove 72 and the oil outlet passages 109 relatively nearer (for example, adjacent) to the axial oil groove 73. In this relative rotational position, the bearing interfaces J1-J1' and J2-J2' are equally loaded.

With reference to FIGS. 9A-9D, presume that the wristpin 100 revolves in the CCW direction from the 0° position relative to the sleeve 46 to a point where the segments J1-J1' are fully loaded, while the segments J2-J2' are separated. As a result of movement in this direction, the oil outlet passage 107 moves across the axial oil groove 72, which enables a pulse of pressurized oil to enter the oil groove from the oil outlet passage, while the separation between the segments J2-J2' allows the oil outlet passages 109 to deliver pressurized oil to the space therebetween.

With reference to FIGS. 10A-10D, presume that the wristpin 100 revolves in the CW direction from the 0° position relative to the sleeve 46 to a point where the segments J2-J2' are fully loaded, while the segments J1-J1' are separated. As a result of movement in this direction, the oil outlet passages 109 cross the axial oil groove 73, which enables a pulse of pressurized oil to enter the oil groove from each of the oil outlet passages, while the separation between the segments J1-J1' allows the oil outlet passage 107 to deliver pressurized oil to the space therebetween.

Figure 1:
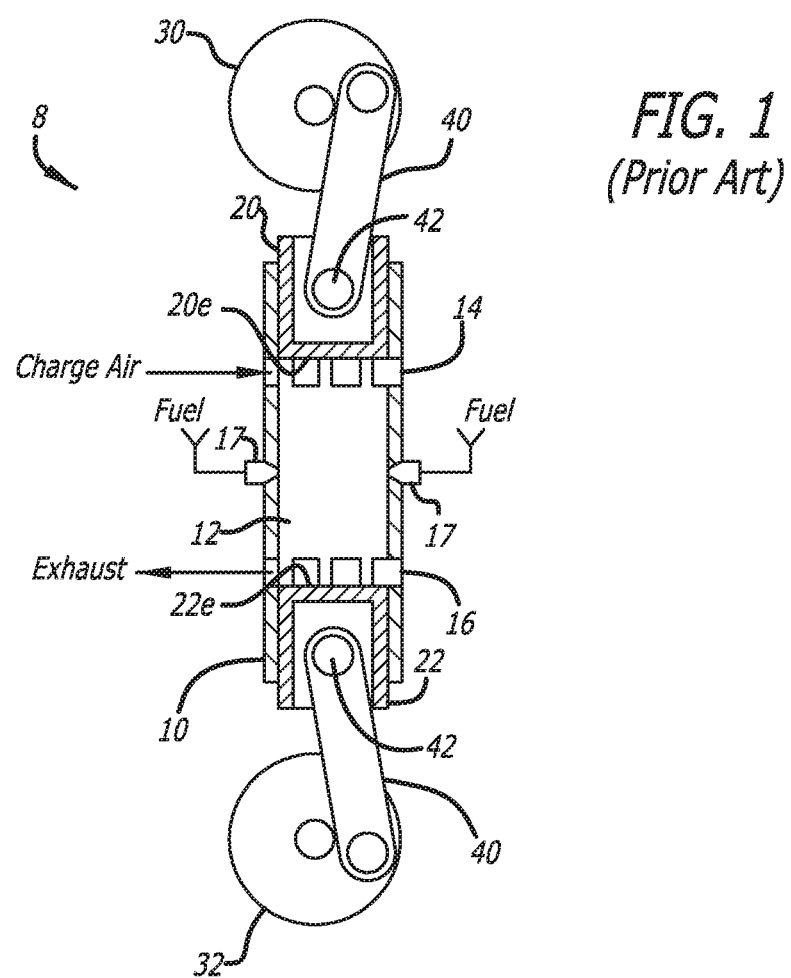
FIG. 1 is a schematic representation of a two-stroke cycle, opposed-piston engine, and is properly labeled "Prior Art".
Figure 11:
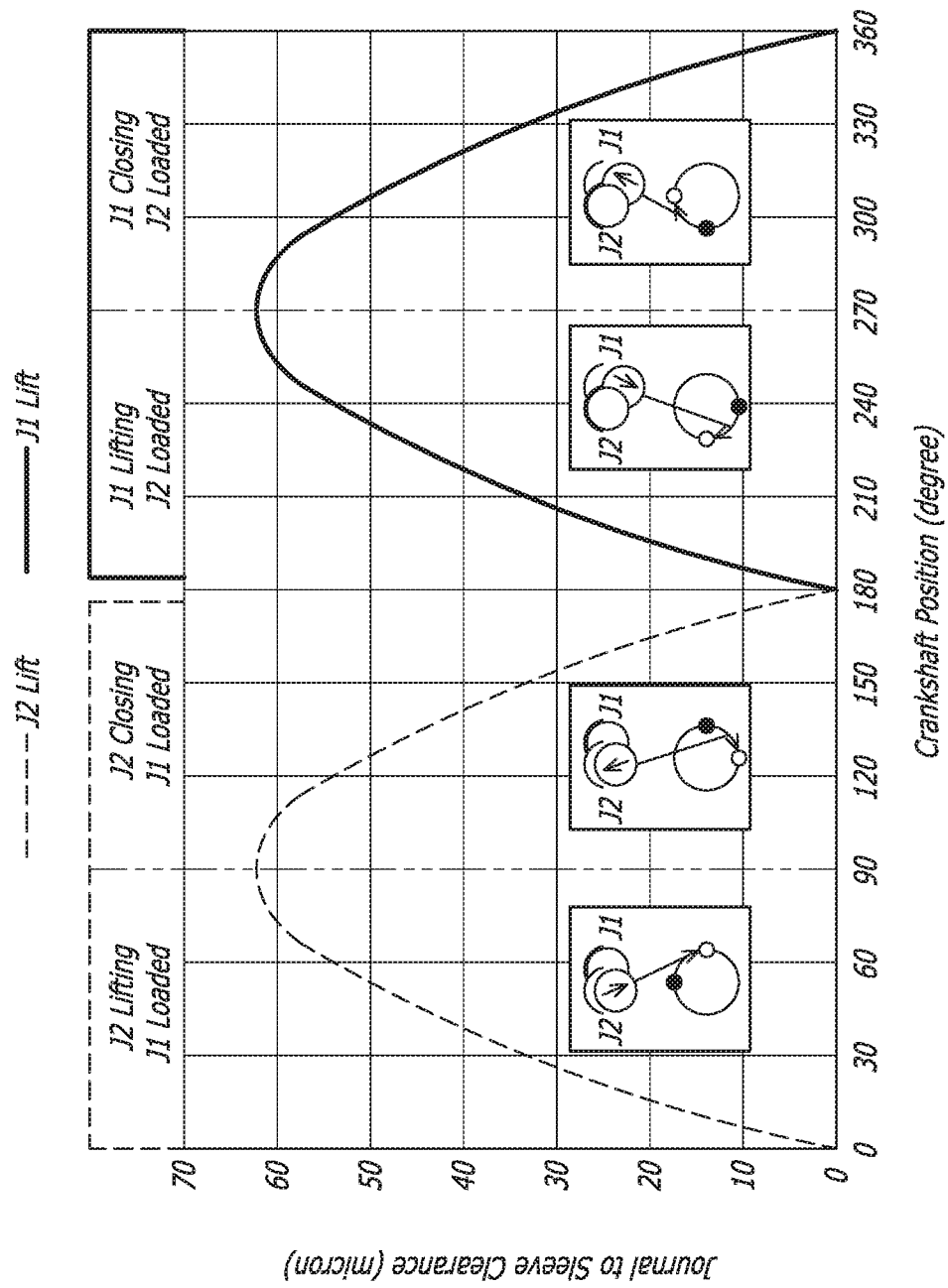
FIG. 11 is a graph showing an operational cycle of the rocking journal bearing of FIG. 7.

FIG. 11 is a graph showing an exemplary operational cycle of a rocking journal bearing as may be observed when the bearing is incorporated into the piston coupling mechanisms of a two-stroke cycle opposed-piston engine such as the engine 8 of FIG. 1. The graph shows wristpin-to-sleeve clearance for the J1-J1' interface and J2-J2' interfaces as a function of the crank angle position (in degrees) of the one of the crankshafts to which the coupling mechanism connects its associated piston. The graph shows a full cycle of crankshaft operation, with the understanding that this represents the operational cycles of each of the two crankshafts seen in FIG. 1 (with or without a phase difference). Further, the graph is representative of the two-stroke cycle operation of the opposed-piston engine of FIG. 1. This graph is based upon load transfer occurring at 0° (TC) and 180° (BC), although this condition should not be considered to be limiting. At a crank angle of 0°, with the piston at TC, the compressive load is about equally divided between the J1-J1' and J2-J2' interfaces, as the crank angle advances, the load is increasingly received by the J1-J1' interface while the J2-J2' segments begin to separate. At a crank angle of 90° the compressive load is maximally borne by the J1-J1' interface, while the J2-J2' segments are maximally separated. At this point, the compressive load begins shifting from the J1-J1' interface to the J2-J2' interface and the J2-J2' surface segments begin to close. At 180°, with the piston at BC, the compressive load is about equally divided between the J1-J1' and J2-J2' interfaces. As the crank angle advances the load is increasingly received by the J2-J2' interface while the J1-J1' segments begin to separate. At a crank angle of 270° the compressive load is maximally borne by the J2-J2' interface, while the J1-J1' segments are maximally separated. At this point, the compressive load begins shifting to the J1-J1' interface from the J2-J2' interface and the J1-J1' segments begin to close. At 360°, the compressive load is about equally divided between the J1-J1' and J2-J2' interfaces, and the cycle repeats.

Figure 12C:
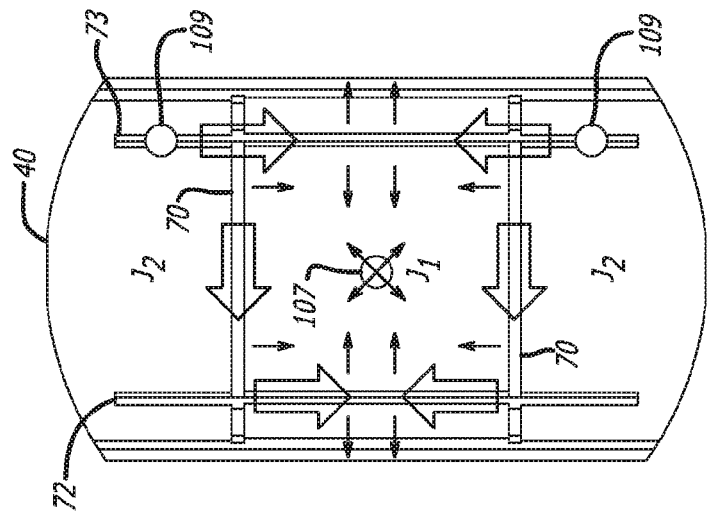
FIGS. 12A-12C illustrate flow paths of pressurized oil delivered to the rocking journal bearing of FIG. 7 at respective points in the operational cycle of the bearing shown in FIG. 11.
Figure 12B:
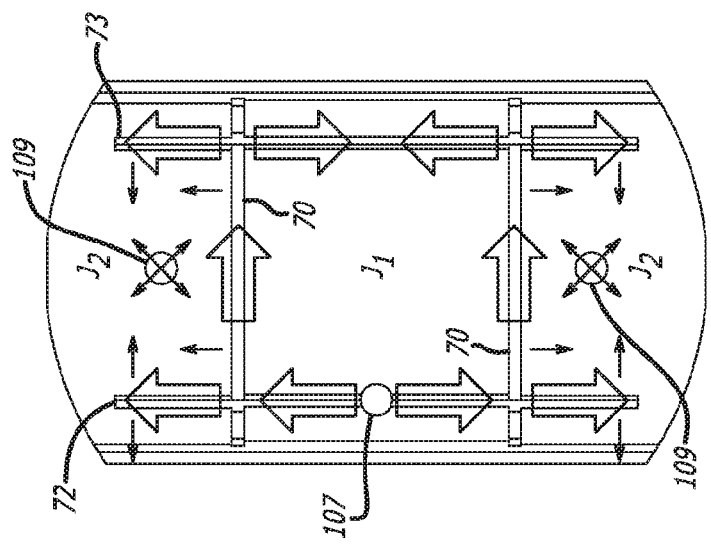
Figure 12A:
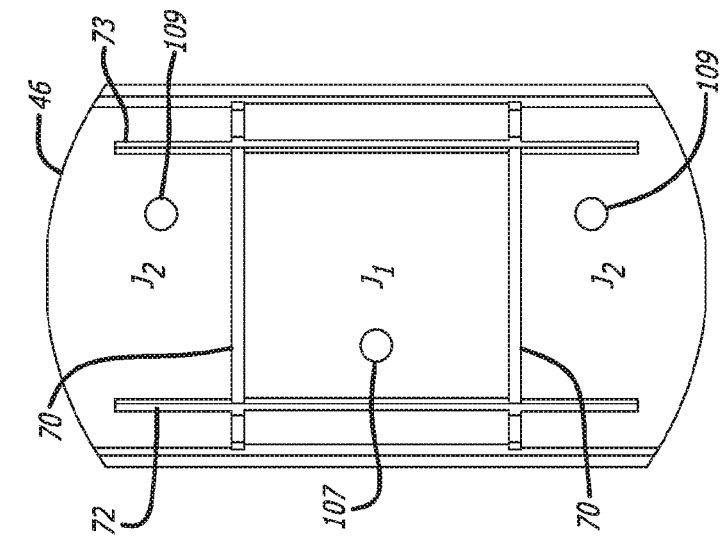

FIGS. 12A-12C show the pressurized oil flow patterns through the sleeve oil grooves 70, 72, and 73 for load transfer points (0° and 180°), for maximum J1 loading, and maximum J2 loading during an engine operating cycle shown in FIGS. 11. At 0° and 180° oscillation, no oil outlet passages align with the sleeve axial grooves 72 and 73, and since all three interfaces are equally loaded, no significant oil is added to the interfaces. At the maximum J1 loading point (90°), the J1 oil outlet passage 107 is aligned with the axial oil groove 72 and oil flows freely through the oil grooves 70, 72, and 73 to fill the J2 lifted segment areas. At the maximum J2 loading point (90°), the two J2 oil outlet passages 109 align with the axial oil groove 73 and oil freely flows into the oil grooves 70, 72, and 73 to fill the J1 lifted segment area.

The column of oil in the piston connecting rod oil passage 64 applies peak positive and negative pressures to the volume of oil in the wristpin gallery when at TC and BC piston positions, respectively. By using the intermittent alignment system described and illustrated above, and in the absence of oil outlet passages positioned in alignment with the circumferential grooves, the only path for oil to flow through during these peak pressure events is between the equally-loaded J1-J1' and J2-J2' surface segments, which is quite restrictive. As a result, this construction has the additional benefit of reducing the system sensitivity to oil pressure fluctuations in the wristpin gallery.

Although this disclosure describes particular embodiments for minimizing oil leakage from journal wristpins in two-stroke cycle, opposed-piston engines, these embodiments are set forth merely as examples of underlying principles of this disclosure. Thus, the embodiments are not to be considered in any limiting sense.

The invention claimed is:
1. A rocking journal bearing for a two-stroke cycle engine, comprising:
   a bearing sleeve including a generally cylindrical bearing surface with a plurality of axially-spaced, eccentrically-disposed surface segments separated by circumferential oil grooves in the bearing surface for transporting oil in a circumferential direction of the bearing surface;
   a plurality of circumferentially-spaced, axial oil grooves in the bearing surface that run across the surface segments and intersect the circumferential oil grooves for transporting oil in an axial direction of the bearing surface;
   a wristpin including a plurality of axially-spaced, eccentrically-disposed journal segments engaged for rocking oscillation with corresponding surface segments; and,
   an oil-receiving space in the wristpin with oil outlet passages acting through the journal segments for delivering oil to the bearing surface; in which,
   there are no oil outlet passages in the wristpin that are aligned with the circumferential oil grooves in the bearing surface; and,
   each outlet passage in each journal segment is positioned between two of said axial oil grooves when a rotational position of the wristpin with respect to the bearing sleeve is 0° as would occur when a load transfer point of the rocking journal bearing is traversed during said rocking oscillation.

2. A rocking journal bearing according to claim 1, wherein:
   the plurality of journal segments includes a first journal segment formed in an intermediate portion of the wristpin, between two second journal segments and the two second journal segments are formed on opposite ends of the wristpin, on respective sides of the first journal segment;
   positioning of a first oil outlet passage locates the first oil outlet passage in the first journal segment at a first arcuate distance from one side of a cut plane containing the longitudinal axis of the wristpin and a radius forming the axis of an oil inlet passage in the wristpin for transporting oil to the oil-receiving space; and,
   positioning of two second oil outlet passages locates each second oil passage in a respective one of the second journal segments at a second arcuate distance from the opposite side of the cut plane;
   in which the first and second arcuate distances are in opposite directions.

3. A rocking journal bearing according to claim 1, wherein the plurality of journal segments includes a first journal segment having a first centerline and two second journal segments sharing a second centerline that is offset from the first centerline, and the first journal segment is disposed between two second journal segments, in which:
   positioning of a first oil outlet passage locates the first oil outlet passage in the first journal segment at a first arcuate distance from one side of a cut plane containing the longitudinal axis of the wristpin and a radius forming the axis of an oil inlet passage in the wristpin for transporting oil to the oil-receiving space;
   positioning of two second oil outlet passages locates each second oil passage in a respective one of the second journal segments at a second arcuate distance from the opposite side of the cut plane; and,
   the first and second arcuate distances are in opposite directions.

4. A two-stroke cycle, opposed-piston engine having first and second rotatable crankshafts, one or more cylinders each with a first piston interconnected by a connecting rod with the first crankshaft and a second piston opposing the first piston and interconnected by a connecting rod with the second crankshaft, a first rocking journal bearing situated between the first piston and its connecting rod and including a plurality of sets of bearing surfaces, a second rocking journal bearing situated between the second piston and its connecting rod and including a plurality of sets of opposed bearing surfaces, in which each rocking journal bearing includes:
- a bearing sleeve including a generally cylindrical bearing surface with a plurality of axially-spaced, eccentrically-disposed surface segments separated by circumferential oil grooves in the bearing surface for transporting oil in a circumferential direction of the bearing surface;
- a plurality of circumferentially-spaced, axial oil grooves in the bearing surface that run across the surface segments and intersect the circumferential oil grooves for transporting oil in an axial direction of the bearing surface;
- a wristpin including a plurality of axially-spaced, eccentrically-disposed journal segments engaged for rocking oscillation with corresponding surface segments; and,
- an oil-receiving space in the wristpin with oil outlet passages acting through the journal segments for delivering oil to the bearing surface; in which,
- there are no oil outlet passages in the wristpin that are aligned with the circumferential oil grooves in the bearing surface; and,
- each oil outlet passage in each journal segment is positioned between two of said axial oil grooves when a rotational position of the wristpin with respect to the bearing sleeve is 0° as would occur when a load transfer point of the rocking journal bearing is traversed during said rocking oscillation.

5. A two-stroke cycle, opposed-piston engine according to claim 4, wherein:
- the plurality of journal segments includes a first journal segment formed in an intermediate portion of the wristpin, between two second journal segments and the two second journal segments are formed on opposite ends of the wristpin, on respective sides of the first journal segment;
- positioning of a first oil outlet passage locates the first oil outlet passage in the first journal segment at a first arcuate distance from one side of a cut plane containing the longitudinal axis of the wristpin and a radius an oil inlet passage in the wristpin for transporting oil to the oil-receiving space; and,
- positioning of two second oil outlet passages locates each second oil passage in a respective one of the second journal segments at a second arcuate distance from the opposite side of the cut plane;
- in which the first and second arcuate distances are in opposite directions.

6. A two-stroke cycle, opposed-piston engine according to claim 4, wherein the plurality of journal segments includes a first journal segment having a first centerline and two second journal segments sharing a second centerline that is offset from the first centerline, and the first journal segment is disposed between two second journal segments, in which:
- positioning of a first oil outlet passage locates the first oil outlet passage in the first journal segment at a first arcuate distance from one side of a cut plane containing the longitudinal axis of the wristpin and a radius an oil inlet passage in the wristpin for transporting oil to the oil-receiving space;
- positioning of two second oil outlet passages locates each second oil passage in a respective one of the second journal segments at a second arcuate distance from the opposite side of the cut plane; and,
- the first and second arcuate distances are in opposite directions.

\* \* \* \* \*